(12) United States Patent
Carnevali

(10) Patent No.: US 9,360,035 B2
(45) Date of Patent: Jun. 7, 2016

(54) ROD-TO-TUBE ADAPTER

(71) Applicant: Jeffrey D. Carnevali, Seattle, WA (US)

(72) Inventor: Jeffrey D. Carnevali, Seattle, WA (US)

( * ) Notice: Subject to any disclaimer, the term of this patent is extended or adjusted under 35 U.S.C. 154(b) by 202 days.

(21) Appl. No.: 14/153,990

(22) Filed: Jan. 13, 2014

(65) Prior Publication Data
US 2015/0198190 A1 Jul. 16, 2015

(51) Int. Cl.
*B25G 3/20* (2006.01)
*F16B 2/00* (2006.01)
*F16B 7/04* (2006.01)
*A01K 97/10* (2006.01)
*F16B 2/04* (2006.01)

(52) U.S. Cl.
CPC ............... *F16B 7/0413* (2013.01); *A01K 97/10* (2013.01); *F16B 2/04* (2013.01); *Y10T 403/7058* (2015.01)

(58) Field of Classification Search
CPC ............ Y10T 403/1616; Y10T 403/1624; Y10T 403/32467; Y10T 403/32483; Y10T 403/7047; Y10T 403/7049; Y10T 403/7051; Y10T 403/7052; Y10T 403/7054; Y10T 403/7058; Y10T 403/7061; F16B 7/0413; F16B 7/14; F16B 7/1445; F16B 2/04
USPC ........... 403/109.1, 109.3, 371, 372, 365, 366, 403/367, 374.1, 376, 377, 381
See application file for complete search history.

(56) References Cited

U.S. PATENT DOCUMENTS

| | | | | |
|---|---|---|---|---|
| 2,422,265 A * | 6/1947 | Squires | .......................... | 219/138 |
| 3,248,998 A * | 5/1966 | Siegel | .............................. | 411/67 |
| 3,250,170 A * | 5/1966 | Siegel | .............................. | 411/53 |
| 3,629,909 A * | 12/1971 | Riley | .............................. | 403/371 |
| 3,652,172 A * | 3/1972 | Zepell | .......................... | 401/106 |
| 4,701,089 A * | 10/1987 | Nettel | .............................. | 411/373 |
| 4,712,811 A * | 12/1987 | Wier | .............................. | 285/113 |
| 5,028,188 A * | 7/1991 | Prince | .............................. | 411/67 |
| 5,087,160 A * | 2/1992 | Pezzutto | .......................... | 411/5 |
| 5,338,304 A * | 8/1994 | Adams | .......................... | 604/110 |
| 5,344,257 A * | 9/1994 | Wright et al. | ............. | 405/259.4 |
| 5,474,479 A * | 12/1995 | Bennett et al. | ................ | 439/843 |
| 5,704,752 A * | 1/1998 | Logerot | ......................... | 411/503 |
| 5,846,041 A * | 12/1998 | Bevan et al. | .................... | 411/65 |
| 6,357,960 B1 * | 3/2002 | Cornelius et al. | ............. | 403/381 |
| 6,626,605 B1 * | 9/2003 | Dean et al. | .................... | 403/344 |
| 6,811,347 B1 * | 11/2004 | Hsieh | ............................ | 403/300 |
| 7,416,490 B2 * | 8/2008 | Parsons et al. | ............... | 463/47.7 |
| 8,215,863 B2 * | 7/2012 | Sohn | .......................... | 403/109.5 |
| 8,414,339 B1 * | 4/2013 | Glick et al. | ................... | 439/843 |
| 8,449,236 B2 * | 5/2013 | McDuff et al. | ............... | 411/344 |
| 8,974,163 B2 * | 3/2015 | Ricketts | ....................... | 411/57.1 |
| 2005/0248156 A1 * | 11/2005 | Hsieh | ............................ | 285/397 |

* cited by examiner

*Primary Examiner* — Gregory Binda
*Assistant Examiner* — Nahid Amiri
(74) *Attorney, Agent, or Firm* — Charles J. Rupnick Attorney at Law

(57) ABSTRACT

A universal rod-to-tube adapter for mounting a rod in a tube holder, wherein the rod-to-tube adapter snugs and rotationally aligns the rod and eliminates rattle and vibration. The rod-to-tube adapter includes both a column centering collar formed as a truncated cone with a central aperture formed therethrough between its base and apex thereof and has resiliently compressible side walls, and a base centering collar formed as a cup with a cross-wise slot is formed in a base thereof, and a plurality of resiliently collapsible semi-rigid centering members extending therefrom adjacent to the base.

21 Claims, 8 Drawing Sheets

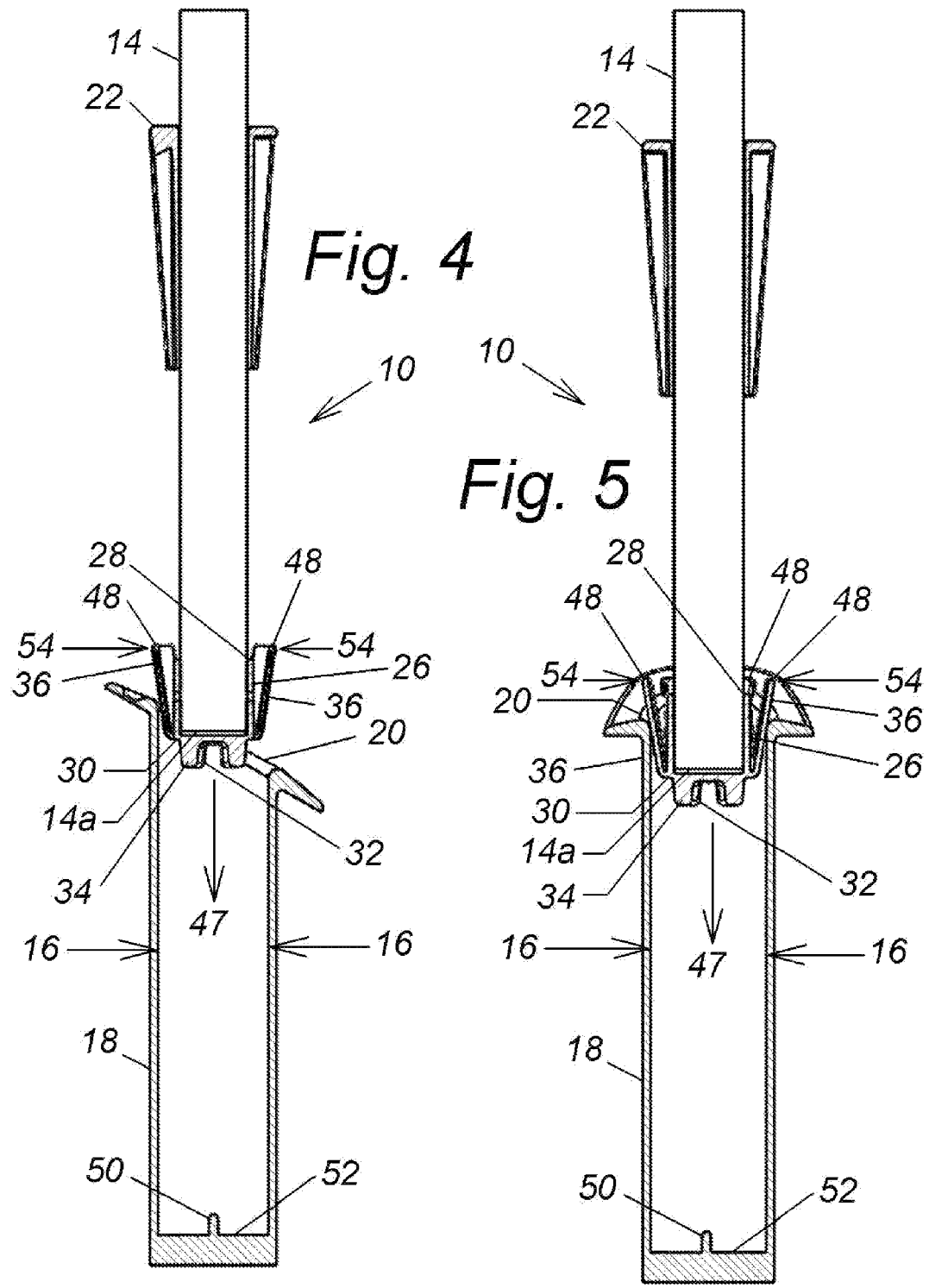

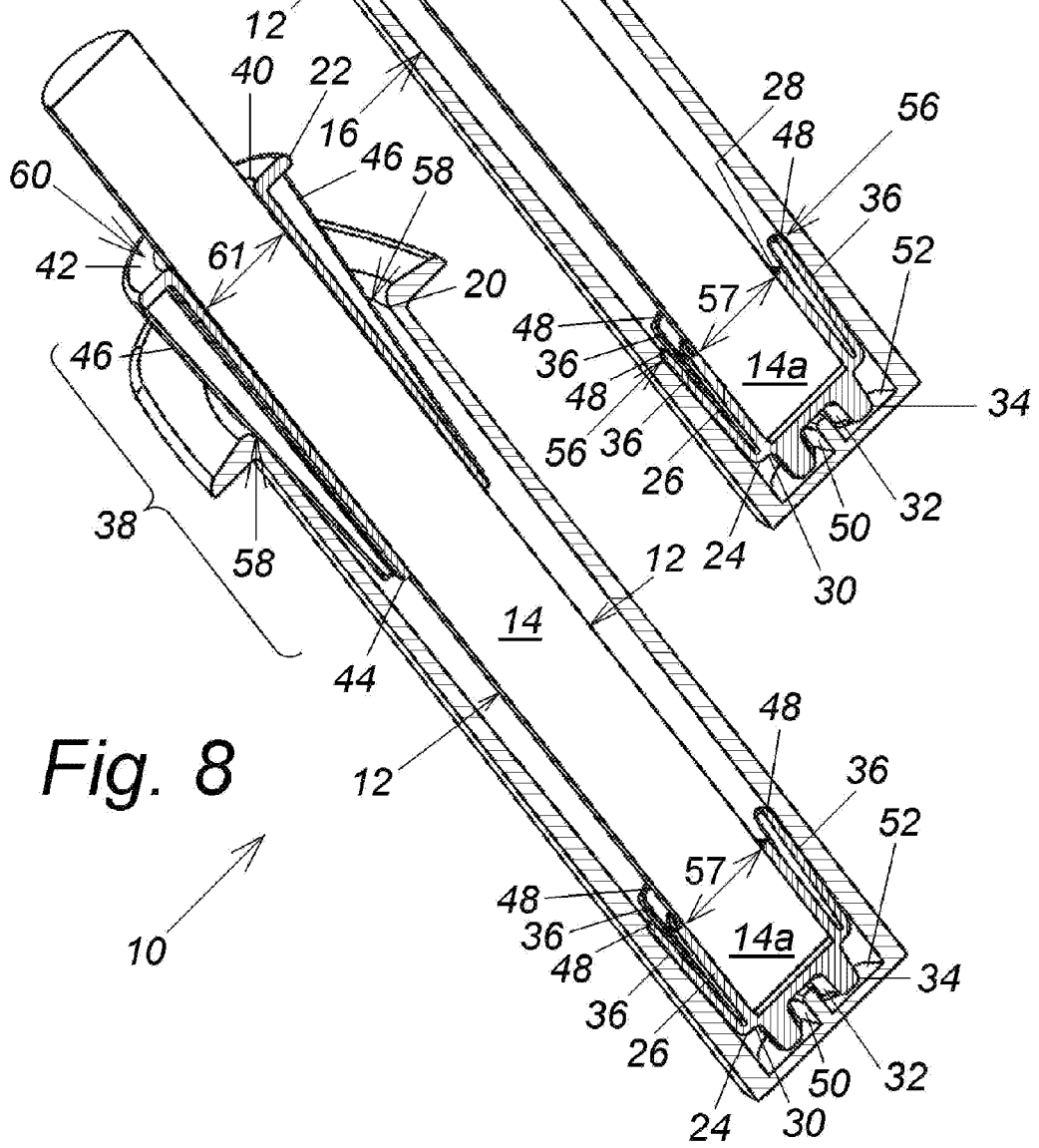

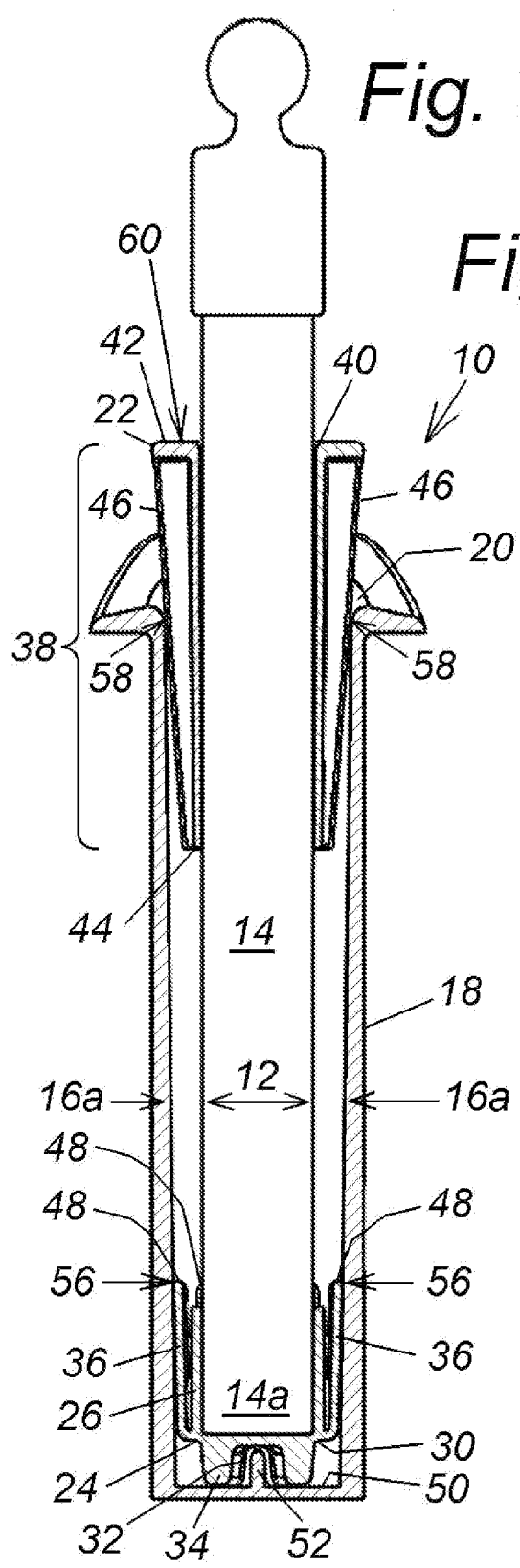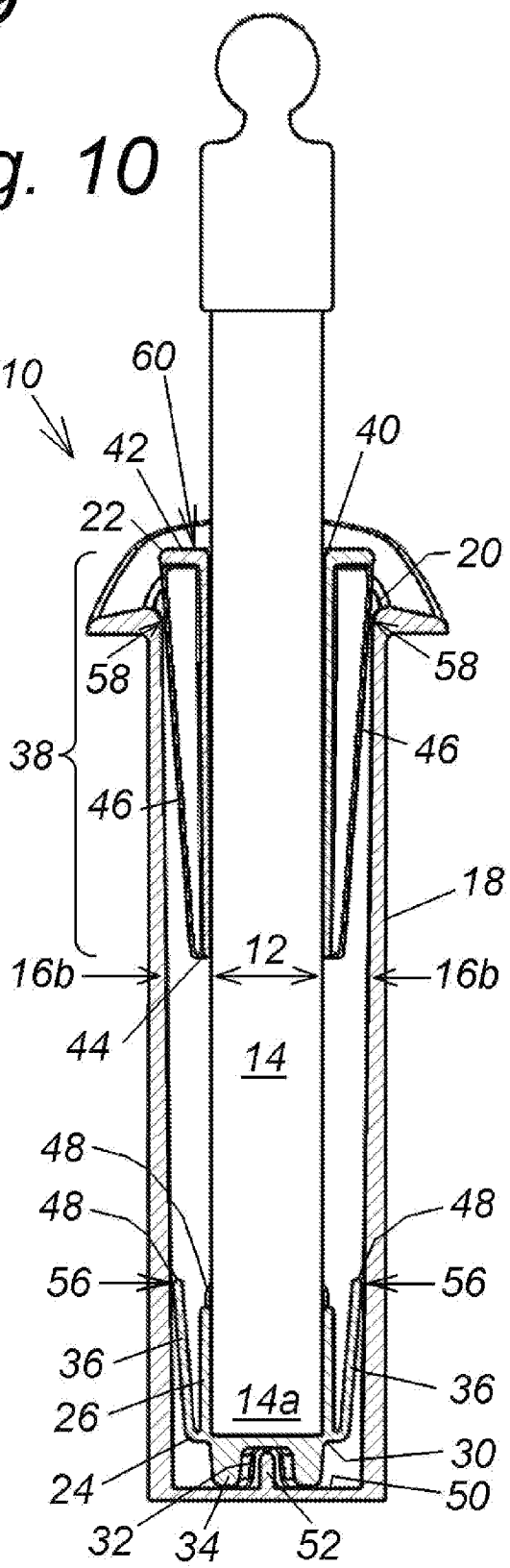

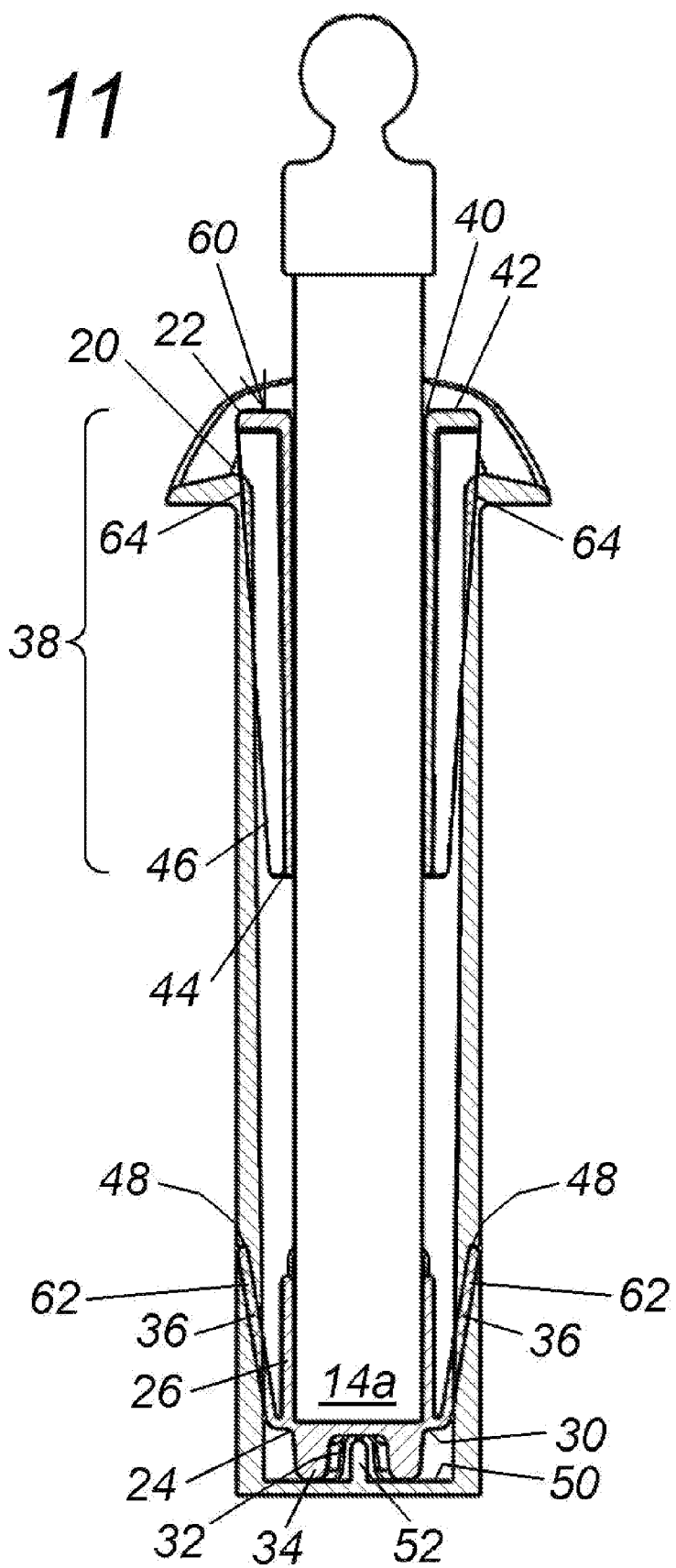

ROD-TO-TUBE ADAPTER

FIELD OF THE INVENTION

The present invention relates to an adapter, and in particular to an adapter for positioning and rotationally aligning a rod in a tube of larger inside diameter than an outside diameter of the rod.

BACKGROUND OF THE INVENTION

It is generally well known to mount a rod, such as a fishing rod or a camera mount, in a universal tube holder, for example on a boat. These universal tube holder provide a means for supporting the rod so the user, whether fisherman or cameraman or other user, does not have to hold it all day.

However, such universal tube holders are intentionally oversized to accept virtually any size fishing rod handle. Accordingly, such known universal tube holders are limited in their ability to efficiently and reliably provide snug, vibration-free support for the rod.

SUMMARY OF THE INVENTION

The present invention is a universal rod-to-tube adapter for mounting a rod, such as a fishing rod or a camera mount, in a universal tube holder. When the rod is a fishing rod, for example mounted on a boat, the universal rod-to-tube adapter snugs and rotationally aligns the fishing rod or other rod and eliminates rattle and vibration.

According to one aspect of the invention, the rod-to-tube adapter includes both a column centering collar and a base centering collar. The column centering collar is formed as a truncated cone with a round central aperture formed therethrough between its round base and round apex thereof, and the cone has resiliently compressible side walls. The base centering collar is formed as a round cup having a round opening thereinto opposite from a round base thereof with a diametrical cross-wise slot is formed in an external portion of the base, and a plurality of resiliently collapsible semi-rigid centering members extending from the base centering collar adjacent to the external portion of the base thereof.

According to another aspect of the invention, the side walls of the truncated cone are formed as a plurality of angularly spaced apart resiliently compressible cone portions extended between the base and the apex, wherein the plurality of resiliently compressible cone portions are uniformly angularly spaced apart around the cone.

According to another aspect of the invention, the plurality of resiliently collapsible semi-rigid centering members of the base centering collar are formed as a plurality of uniformly angularly spaced apart centering members.

According to another aspect of the invention, an inside diameter of the central aperture of the column centering collar is approximately the same as an inside diameter of the cup of the base centering collar.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 illustrates beginning of insertion of the rod into the target tube, wherein the base centering collar of the rod-to-tube adapter of FIG. 1 is adjacent to the opening into the tube, and wherein the plurality of resiliently collapsible semi-rigid centering members are extended from the cup adjacent to the base thereof and directed generally toward the cup opening 28, and the diametrical cross-wise slot of the cup base is generally rotationally aligned the target flush rod holder tube with a matching key in a bottom surface thereof;

FIG. 5 again illustrates initial insertion of the rod into the target tube, wherein during insertion of the rod, the plurality of semi-rigid centering members of the base centering collar of the rod-to-tube adapter of FIG. 1 resiliently collapse as the cup portion enters into the target tube, whereby the centering members are forced to collapse to enter through the opening into the tube;

FIG. 7 illustrates seating of the base centering collar of the rod-to-tube adapter of FIG. 1 against the bottom surface of the tube, wherein the plurality of resiliently collapsed semi-rigid centering members of the base centering collar resiliently expand between the rod and the inside diameter of the tube, while the diametrical cross-wise slot in the cup base is fitted with the matching key in the bottom surface of the tube, whereby expansion of the resiliently collapsed semi-rigid centering members of the base centering collar snug and substantially center the rod relative to the inside diameter of the tube, and the cross-wise slot mates with the matching key and rotationally aligns the rod with the tube;

FIG. 8 illustrates seating of the column centering collar of the rod-to-tube adapter of FIG. 1 against the tube opening, wherein the resiliently compressible cone side walls of the truncated cone are resiliently compressed between the outside diameter of the rod and the inside diameter of the tube at the opening thereinto by a applied that, when applied substantially along direction of the rod, as illustrated, compresses the resiliently compressible side walls of the truncated cone into interference contact with the inside diameter of the tube at its opening;

FIG. 9 illustrates the rod-to-tube adapter of FIG. 1 with a target tube having an inside diameter that is sized substantially a minimum diameter for receiving the base centering collar and column centering collar of the rod-to-tube adapter of the invention;

FIG. 10 illustrates the rod-to-tube adapter of FIG. 1 with a target tube having an inside diameter that is sized substantially a maximum diameter for receiving the base centering collar and column centering collar of the rod-to-tube adapter of the invention; and FIG. 11 illustrates a potential interference zone between the base centering collar of the rod-to-tube adapter of FIG. 1 and the inside diameter of the target tube adjacent to the base portion the of the rod, and FIG. 11 also illustrates another potential interference zone between the column centering collar of the rod-to-tube adapter of FIG. 1 and the inside diameter of the target tube at the opening thereinto.

DETAILED DESCRIPTION OF PREFERRED EMBODIMENT

As required, a detailed illustrative embodiment of the present protective enclosure is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the figures, like numerals indicate like elements.

Figure 1:
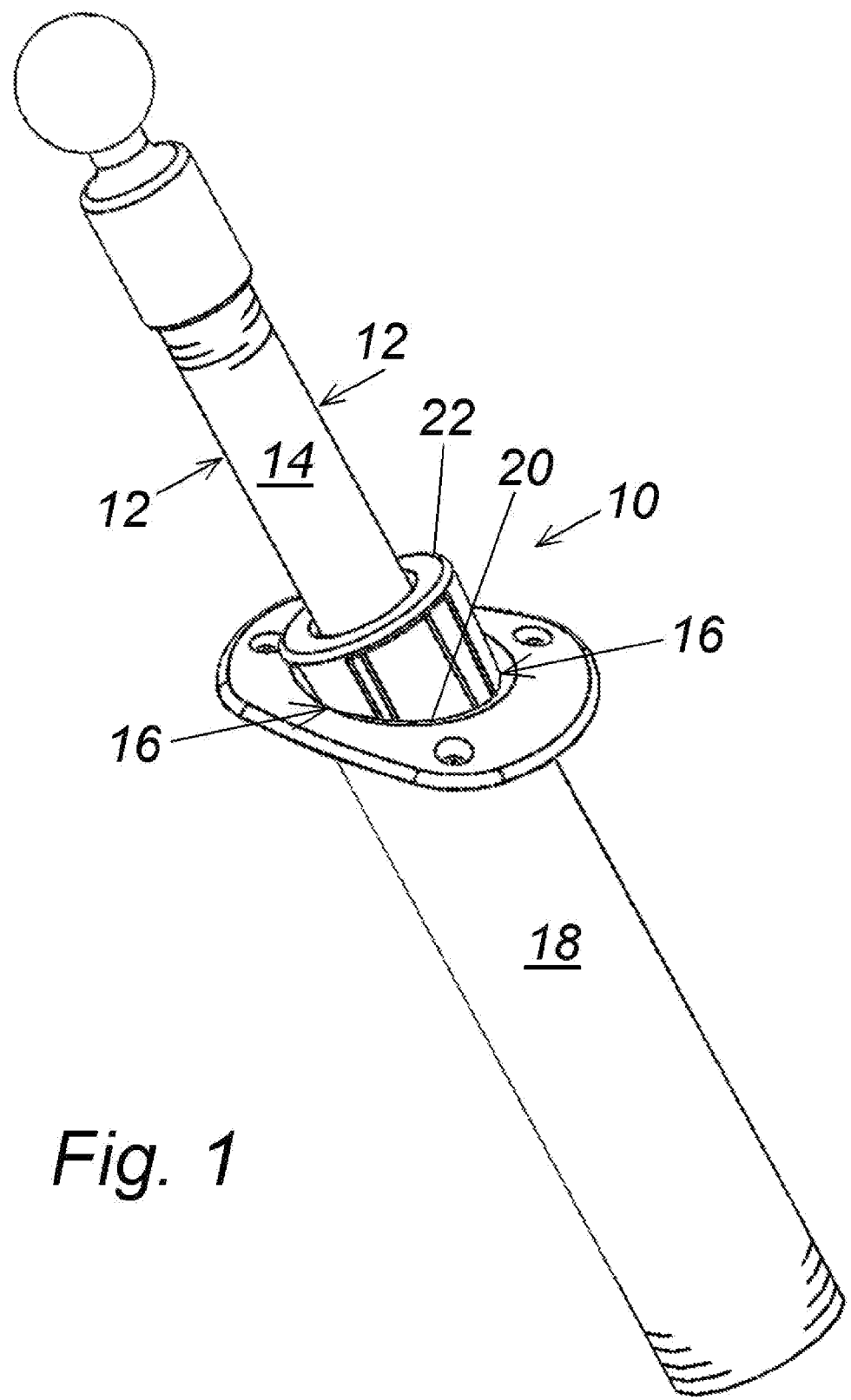
FIG. 1 is a perspective view showing an example of the rod-to-tube adapter of the invention for adapting an outside diameter of a rod to an inside diameter of a tube, wherein the inside diameter of the tube is larger than the outside diameter of the rod.

FIG. 1 illustrates a rod-to-tube adapter 10 for adapting an outside diameter 12 of a rod 14 to an inside diameter 16 of a tube 18, wherein inside diameter 16 of tube 18 is larger than outside diameter 12 of rod 14. By example and without limitation, rod 14 is the handle of a fishing rod. Here, tube 18 is shown, by example and without limitation, as being a flush mount fishing rod holder on a boat, but rod-to-tube adapter 10 is also useful for adapting rod 14 to other types of tube rod holders, such as open ended, or side mount, or rail mount fishing rod holders. Additionally, rod-to-tube adapter 10 is not limited to adapting fishing rods to rod holders, but is also useful for adapting any rod 14 to other tubes 18, wherein outside diameter 12 of rod 14 is smaller than inside diameter 16 of tube 18.

Rod 14 is inserted into tube 18 through an opening 20 thereinto. Previously, a column centering collar 22 of rod-to-tube adapter 10 is installed over outside diameter 12 of rod 14 before rod 14 is inserted through opening 20 into tube 18.

Figure 2:
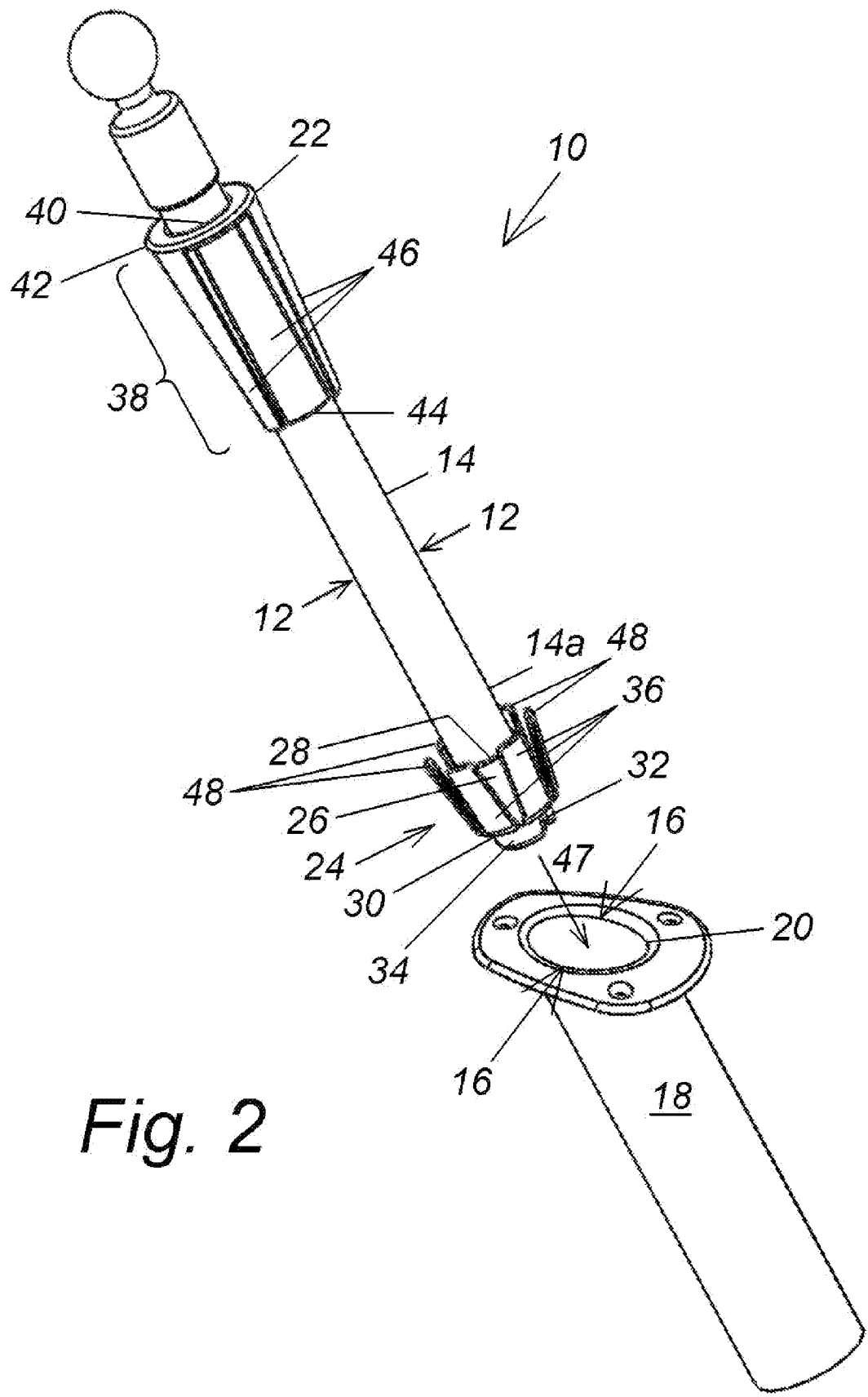
FIG. 2 shows the rod of the rod-to-tube adapter of FIG. 1 being completely free of the tube for being installed into the tube, wherein the rod is shown with a base centering collar of the rod-to-tube adapter mounted on a base portion of the rod with the base centering collar having a round cup having a round opening thereinto opposite from a round base thereof, a diametrical cross-wise slot formed in an external portion of the cup base, and a plurality of resiliently collapsible semi-rigid centering members extended from the cup adjacent to the base thereof and directed generally toward the cup opening; and the column centering collar is shown formed as a truncated cone with a round central aperture formed therethrough between a round base and a round apex thereof, the truncated cone being formed with resiliently compressible side walls that are optionally formed of a plurality of substantially uniformly angularly spaced apart and resiliently compressible cone portions extended between the base and apex of the truncated cone.

FIG. 2 shows rod 14 completely free of tube 18. Rod 14 is shown with a base centering collar 24 of rod-to-tube adapter 10 mounted on a base portion 14a of rod 14. Base centering collar 24 includes a round cup 26 having a round opening 28 thereinto opposite from a round base 30 thereof. A diametrical cross-wise slot 32 is formed in an external portion 34 of cup base 30, and a plurality of resiliently collapsible semi-rigid centering members 36 are extended from cup 26 adjacent to base 30 thereof directed generally toward cup opening 28. Plurality of resiliently collapsible semi-rigid centering members 36 are substantially uniformly angularly spaced apart around cup base 30.

Column centering collar 22 is formed as a truncated cone 38 with a round central aperture 40 formed therethrough between a round base 42 and a round apex 44 thereof. Truncated cone 38 is formed with resiliently compressible side walls 46. Cone side walls 46 are optionally formed of a plurality of substantially uniformly angularly spaced apart and resiliently compressible cone portions extended between base 42 and apex 44 of truncated cone 38.

After column centering collar 22 of rod-to-tube adapter 10 is installed over outside diameter 12 of rod 14, and base centering collar 24 of rod-to-tube adapter 10 mounted on a base portion 14a of rod 14, rod 14 is inserted through opening 20 into tube 18 (arrow 47). Plurality of semi-rigid centering members 36 of base centering collar 24 extend angularly outwardly of cup 26 from adjacent to cup base 30. Ideally, at least individual end portions 48 of centering members 36 are initially expanded a distance greater than inside diameter 16 of target tube 18. Accordingly, centering members 36 are forced to collapse to enter through opening 20 into tube 18.

According to one embodiment, one or both of column centering collar 22 and base centering collar 24 of rod-to-tube adapter 10 is formed of an elastomeric material.

Figure 3:
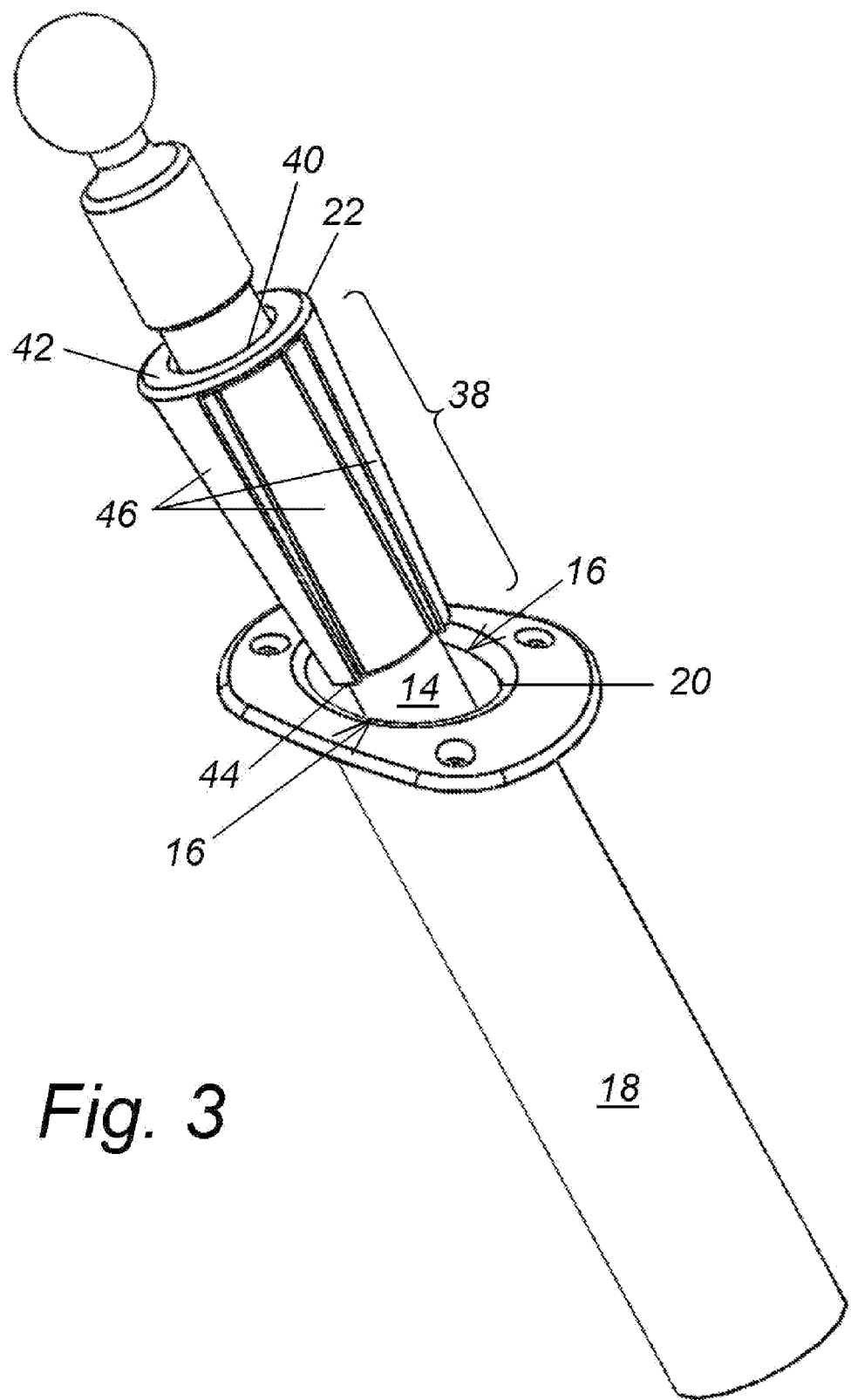
FIG. 3 illustrates the rod partially inserted into the target tube, wherein the base centering collar of the rod-to-tube adapter of FIG. 1 is already within the target tube and having its centering members already collapsed within the inside diameter of the tube.

FIG. 3 illustrates rod 14 partially inserted into target tube 18, wherein base centering collar 24 of rod-to-tube adapter 10 is already within target tube 18 and having centering members 36 collapsed within inside diameter 16 thereof.

FIG. 4 illustrates beginning of insertion of rod 14 into target tube 18 (arrow 47), wherein base centering collar 24 of rod-to-tube adapter 10 is adjacent to opening 20 into tube 18, and wherein plurality of resiliently collapsible semi-rigid centering members 36 are extended from cup 26 adjacent to base 30 thereof directed generally toward cup opening 28. Diametrical cross-wise slot 32 formed in external portion 34 of cup base 30 is generally aligned with a matching key 50 in flush rod holder having matching key directed upwardly toward opening 20 into tube 18 in a bottom surface 52 thereof.

Column centering collar 22 of rod-to-tube adapter 10 is over outside diameter 12 of rod 14 and spaced away from base centering collar 24 of rod-to-tube adapter 10 mounted on a base portion 14a of rod 14. Initially, before rod 14 is inserted through opening 20 into tube 18 (arrow) plurality of semi-rigid centering members 36 of base centering collar 24 are expanded angularly outwardly of cup 26 from adjacent to cup base 30. As illustrated, initially individual end portions 48 of centering members 36 are ideally an expanded size 54 at least greater than inside diameter 16 of target tube 18.

FIG. 5 again illustrates initial insertion of rod 14 into target tube 18. During insertion of rod 14, plurality of semi-rigid centering members 36 of base centering collar 24 resiliently collapse as cup 26 enters into target tube 18. Accordingly, centering members 36 are forced to collapse to enter through opening 20 into tube 18.

Figure 6:
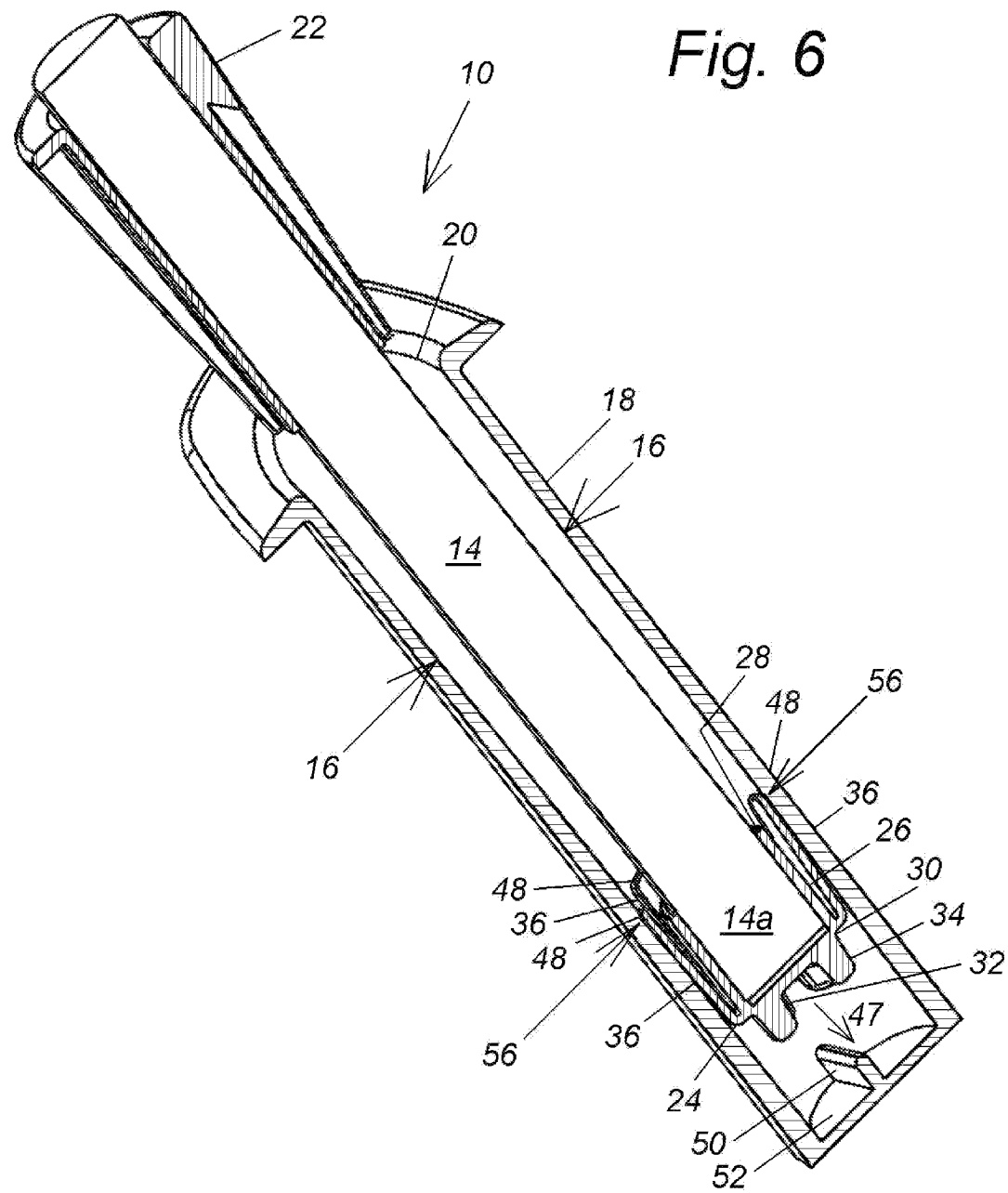
FIG. 6 illustrates the rod partially inserted into the target tube, wherein during insertion of the rod, the plurality of semi-rigid centering members of the base centering collar of the rod-to-tube adapter of FIG. 1 resiliently collapse from their expanded size as the cup enters into the smaller inside diameter of the target tube, such that the centering members are collapsed to a restricted size that is substantially the same as the inside diameter of the tube.

FIG. 6 illustrates rod 14 partially inserted into target tube 18. During insertion of rod 14, plurality of semi-rigid centering members 36 of base centering collar 24 resiliently collapse from expanded size 54 as cup 26 enters into smaller inside diameter 16 of target tube 18. Accordingly, centering members 36 are collapsed to a restricted size 56 substantially the same as inside diameter 16 of tube 18.

FIG. 7 illustrates seating of base centering collar 24 against bottom surface 52 of tube 18, wherein plurality of resiliently collapsed semi-rigid centering members 36 of base centering collar 24 resiliently expand between rod 14 and inside diameter 16 of tube 18, while diametrical cross-wise slot 32 in external portion 34 of cup base 30 is fitted with matching key 50 in bottom surface 52 of tube 18. Accordingly, expansion of resiliently collapsed semi-rigid centering members 36 of base centering collar 24 snug and substantially center rod 14 relative to inside diameter 16 of tube 18, and cross-wise slot 32 mating with matching key 50 rotationally aligns rod 14 with tube 18.

According to one embodiment, round inside diameter 57 of cup 26 of base centering collar 24 is sized to be snuggly fitted over outside diameter 12 of rod 14. Accordingly, when side walls 46 of truncated cone 38 are resiliently compressed into interference contact with inside diameter 16 of tube 18 by applied force 60, inside diameter 61 of column centering collar 22 is compressed against outside diameter 12 of rod 14. Base centering collar 24 thereby operates to snug and substantially center rod base portion 14a of rod 14 relative to inside diameter 16 of tube 18.

FIG. 8 illustrates seating of column centering collar 22 against opening 20 into tube 18. Resiliently compressible cone side walls 46 of truncated cone 38 are resiliently compressed (indicated 2 places at arrow 58) between outside diameter 12 of rod 14 and inside diameter 16 of tube 18 at opening 20 thereinto. Such resilient compression of cone side walls 46 is accomplished by a force 60 applied, for example at cone base 42. When applied substantially along direction of rod 14, as illustrated, force 60 compresses resiliently compressible side walls 46 of truncated cone 38 into interference contact with inside diameter 16 of tube 18 at opening 20.

According to one embodiment, round central aperture 40 is formed having an inside diameter 61 substantially the same as inside diameter 57 of cup 26 of base centering collar 24. Optionally, inside diameter 61 of column centering collar 22 and inside diameter 57 of cup 26 of base centering collar 24 are both sized to be snuggly fitted over rod 14 of a substantially constant outside diameter 12. However, rod 14 does not need to be of a substantially constant outside diameter 12 for rod-to-tube adapter 10 to operate as intended. Furthermore, inside diameter 61 of column centering collar 22 does not need to be of substantially the same as inside diameter 57 of cup 26 of base centering collar 24 for rod-to-tube adapter 10 to operate as intended.

Accordingly, when inside diameter 61 of column centering collar 22 is compressed against outside diameter 12 of rod 14 by force 60 applied and cone side walls 46 are similarly resiliently compressed against inside diameter 16 of tube 18, column centering collar 22 thereby operates in combination with resiliently compressed base centering collar 24 to snug and substantially center rod 14 relative to inside diameter 16 of tube 18. Thus, snug column centering collar 22 and base centering collar 24 of rod-to-tube adapter 10 cooperate for rotationally aligning rod 14 in target tube 18 and for eliminating rattle or vibration.

FIG. 9 illustrates tube 18 being formed with an inside diameter 16a sized substantially a minimum diameter for receiving base centering collar 24 and column centering collar 22 of rod-to-tube adapter 10. Accordingly, application of force 60 drives column centering collar 22 a minimum distance into tube 18 for seating against opening 20 thereof before interference due to resilient radial compression cone side walls 46 of truncated cone 38 (indicated 2 places at arrow 58).

FIG. 10 illustrates tube 18 being formed with an inside diameter 16b sized substantially a maximum diameter for receiving base centering collar 24 and column centering collar 22 of rod-to-tube adapter 10. Accordingly, application of force 60 drives column centering collar 22 a maximum distance into tube 18 for seating against opening 20 thereof before interference due to resilient radial compression cone side walls 46 of truncated cone 38 (indicated 2 places at arrow 58).

FIG. 11 illustrates cross-hatched potential interference zone 62 between base centering collar 24 of rod-to-tube adapter 10 and inside diameter 16 of tube 18 adjacent to base portion 14a of rod 14. FIG. 11 also illustrates cross-hatched potential interference zone 64 between column centering collar 22 of rod-to-tube adapter 10 and inside diameter 16 of tube 18 at opening 20 thereinto.

Accordingly, column centering collar 22 and base centering collar 24 of rod-to-tube adapter 10 cooperate for rotationally aligning rod 14 and for eliminating rattle or vibration in target tube 18 of a variety of different diameters 16 between minimum inside diameter 16a and maximum inside diameter 16b, wherein column centering collar 22 and base centering collar 24 can both fit into tube 18 and expand sufficiently to at least partially compress against inside diameter 16 thereof.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A rod-to-tube adapter, comprising:
    a column centering collar comprising a truncated cone with a central aperture formed therethrough between a base and an apex thereof, the cone having resiliently compressible side walls; and
    a base centering collar comprising a cup having an opening thereinto opposite from a base thereof, a cross-wise slot formed in an external portion of the base, and a plurality of resiliently collapsible semi-rigid centering members; and
    wherein the column centering collar and the base centering collar are sized for being installed over an outside diameter of a single rod and being inserted into a tube, wherein the outside diameter of the rod is sized smaller than the inside diameter of the tube such that the inside diameter of the tube is spaced away from the outside diameter of the rod when the rod is inserted into the tube; and
    wherein, when the rod is inserted into the tube, at least one or both of the resiliently compressible side walls of the column centering collar, or the plurality of resiliently collapsible semi-rigid centering members of the base centering collar, are resiliently compressed between the outside diameter of the rod and the inside diameter of the tube.

2. The rod-to-tube adapter of claim 1, wherein the side walls of the truncated cone further comprise a plurality of angularly spaced apart resiliently compressible cone portions extended between the base and the apex.

3. The rod-to-tube adapter of claim 2, wherein the plurality of angularly spaced apart resiliently compressible cone portions are uniformly angularly spaced apart.

4. The rod-to-tube adapter of claim 1, wherein the plurality of resiliently collapsible semi-rigid centering members of the base centering collar further comprise a plurality of angularly spaced apart centering members.

5. The rod-to-tube adapter of claim 4, wherein the plurality of resiliently collapsible semi-rigid centering members of the base centering collar are uniformly angularly spaced apart.

6. The rod-to-tube adapter of claim 1, wherein the plurality of resiliently collapsible semi-rigid centering members are further extended from the base centering collar adjacent to the external portion of the base thereof.

7. The rod-to-tube adapter of claim 1, wherein the central aperture of the column centering collar is approximately the same diameter as the cup of the base centering collar.

8. A rod-to-tube adapter, comprising:
   a column centering collar comprising an elongated truncated cone with a round central aperture extended lengthwise entirely therethrough between a round base and a round apex thereof, the cone being formed with a plurality of resiliently compressible side walls; and
   a base centering collar comprising a round cup formed with a round opening thereinto opposite from a round base thereof, a cross-wise slot formed in an external portion of the base diametrically of the cup, and a plurality of resiliently collapsible semi-rigid centering members extended outwardly adjacent to the external portion of the base thereof; and
   wherein the column centering collar and the base centering collar are sized for being installed over an outside diameter of a single rod and being inserted into a tube, wherein the outside diameter of the rod is sized smaller than the inside diameter of the tube such that the inside diameter of the tube is spaced away from the outside diameter of the rod when the rod is inserted into the tube; and
   wherein, when the rod is inserted into the tube, at least one or both of the plurality of resiliently compressible side walls of the column centering collar, or the plurality of resiliently collapsible semi-rigid centering members of the base centering collar, are collapsed to enter into the tube and are resiliently compressed between the outside diameter of the rod and the inside diameter of the tube for substantially centering the rod relative to the inside diameter of the tube.

9. The rod-to-tube adapter of claim 8, wherein the side walls of the truncated cone further comprise a plurality of uniformly angularly spaced apart resiliently compressible cone portions extended between the base and the apex.

10. The rod-to-tube adapter of claim 9, wherein the plurality of angularly spaced apart resiliently compressible cone portions are uniformly angularly spaced apart.

11. The rod-to-tube adapter of claim 8, wherein the plurality of resiliently collapsible semi-rigid centering members of the base centering collar further comprise a plurality of uniformly angularly spaced apart centering members.

12. The rod-to-tube adapter of claim 11, wherein the plurality of resiliently collapsible semi-rigid centering members of the base centering collar are uniformly angularly spaced apart.

13. The rod-to-tube adapter of claim 8, wherein the plurality of resiliently collapsible semi-rigid centering members are further extended from the base centering collar adjacent to the external portion of the base thereof.

14. The rod-to-tube adapter of claim 8, wherein the central aperture of the column centering collar is approximately the same diameter as the cup of the base centering collar.

15. A rod-to-tube adapter, comprising:
   a column centering collar formed of an elastomeric material and comprising an elongated truncated cone with a round central aperture extended lengthwise entirely therethrough between a round base and a round apex thereof, the cone being formed with a plurality of resiliently compressible side walls;
   a base centering collar formed of an elastomeric material and comprising a round cup formed with a round opening thereinto opposite from a round base thereof, a crosswise slot formed in an external portion of the base diametrically of the cup, and a plurality of resiliently collapsible semi-rigid centering members extended outwardly adjacent to the external portion of the base thereof;
   a rod having an outside diameter; and
   a tube having an inside diameter larger than the outside diameter of the rod and an opening thereinto; and
   wherein the base centering collar is mounted on a base portion of the rod, the column centering collar is installed over the outside diameter of the rod in a position spaced away from the base portion thereof, and the rod is inserted into the tube through the opening thereof with the base centering collar positioned adjacent to a bottom surface of the tube and the column centering collar positioned partially inside the tube and partially externally of the opening thereinto; and
   wherein, when the rod is inserted into the tube, both of the plurality of resiliently compressible side walls of the column centering collar and the plurality of resiliently collapsible semi-rigid centering members of the base centering collar resiliently collapse to enter into the tube through the opening thereof and are resiliently compressed between the outside diameter of the rod and the inside diameter of the tube to snug and substantially center the rod relative to the inside diameter of the tube.

16. The rod-to-tube adapter of claim 15, wherein the column centering collar is installed over the outside diameter of the rod with the apex thereof facing toward the base portion thereof.

17. The rod-to-tube adapter of claim 16, wherein the cup of the base centering collar is smaller in diameter than the inside diameter of the tube.

18. The rod-to-tube adapter of claim 17, wherein the plurality of resiliently collapsible semi-rigid centering members of the base centering collar are compressed to a restricted size less than an expanded size thereof.

19. The rod-to-tube adapter of claim 18, wherein the expanded size of the plurality of resiliently collapsible semi-rigid centering members of the base centering collar is larger than the inside diameter of the tube.

20. The rod-to-tube adapter of claim 16, wherein the apex of the column centering collar is smaller in diameter than the inside diameter of the tube.

21. The rod-to-tube adapter of claim 20, wherein the base of the column centering collar is larger in diameter than the inside diameter of the tube.

* * * * *